(12) United States Patent
Nagano

(10) Patent No.: US 6,518,940 B2
(45) Date of Patent: *Feb. 11, 2003

(54) IMAGE DISPLAY APPARATUS

(75) Inventor: Akihiko Nagano, Ichihara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,312

(22) Filed: Feb. 18, 1999

(65) Prior Publication Data

US 2002/0050957 A1 May 2, 2002

(30) Foreign Application Priority Data

Feb. 24, 1998 (JP) .......................... 10-041511

(51) Int. Cl.$^7$ .................................. G09G 3/00
(52) U.S. Cl. ................. 345/32; 345/7; 345/8; 348/761; 348/766
(58) Field of Search ............... 345/7–9, 32; 359/630, 359/631, 632; 348/767, 96, 97, 98, 766, 761, 744, 759, 760

(56) References Cited

U.S. PATENT DOCUMENTS

| | | | | |
|---|---|---|---|---|
| 4,099,841 A | * | 7/1978 | Ellis ........................ 350/173 |
| 5,315,377 A | * | 5/1994 | Isono et al. ................ 359/630 |
| 5,528,263 A | * | 6/1996 | Platzker et al. ............ 345/156 |
| 5,548,347 A | * | 8/1996 | Melnik et al. ............. 348/761 |
| 5,583,335 A | * | 12/1996 | Spitzer et al. ............. 359/630 |
| 5,777,794 A | * | 7/1998 | Nakaoka .................... 359/632 |
| 5,805,274 A | * | 9/1998 | Saita ........................ 348/761 |
| 5,880,711 A | * | 3/1999 | Tamada ...................... 345/139 |
| 5,977,938 A | * | 11/1999 | Iwasa .......................... 345/32 |
| 6,011,653 A | * | 1/2000 | Karasawa ................... 359/630 |
| 6,061,084 A | * | 5/2000 | Perlin .......................... 348/51 |
| 6,061,103 A | * | 5/2000 | Okamura et al. ............. 345/32 |
| 6,075,645 A | * | 6/2000 | Hasushita ................... 359/431 |
| 6,078,409 A | * | 6/2000 | Kunishige .................... 348/96 |
| 6,151,445 A | * | 11/2000 | Nishimura .................... 348/96 |
| RE37,056 E | * | 2/2001 | Wortel ........................ 348/761 |
| 6,191,810 B1 | * | 2/2001 | Oosaka et al. ................ 348/96 |
| 6,191,811 B1 | * | 2/2001 | Nishimura et al. ........... 348/96 |
| 6,292,234 B1 | * | 9/2001 | Miyake et al. .............. 348/766 |
| 6,313,888 B1 | * | 11/2001 | Tabata ....................... 348/790 |
| 6,339,447 B1 | * | 1/2002 | Kurahashi et al. ............ 348/96 |

* cited by examiner

Primary Examiner—Richard Hjerpe
Assistant Examiner—Kimnhung Nguyen
(74) Attorney, Agent, or Firm—Robin, Blecker & Daley (57) ABSTRACT

An image display apparatus includes a storage display element which stores an image by receiving image light from a film frame and displays the stored image, a display device capable of selectively displaying one of a film frame number and information other than the film frame number, and a control circuit which inhibits an image storing action on the storage display element when no film frame number is displayed by the display device.

8 Claims, 7 Drawing Sheets

IMAGE DISPLAY APPARATUS

BACKGROUND OF THE INVENTION

1. Field of the Invention

The present invention relates to an image display apparatus arranged to display an image recorded on a developed film by using a storage display element.

2. Description of Related Art

Images or pictures taken by a camera on a film are generally developed and printed on printing paper to be appreciated as photographs. However, some apparatuses recently marketed are arranged to electronically read an image recorded on a film (hereinafter referred to as a film image), as an electronic image, by means of a film scanner or the like to have the electronic image appreciated on a TV monitor or the like. However, since these apparatuses are not provided with any image storing function, the read film image is erased when the power supply is turned off.

Meanwhile, an image display apparatus which has been also recently disclosed is arranged to store a film image taken by a camera in a spatial light modulator and to have the stored the film image displayed for appreciation.

In such an image display apparatus, the film image is written into the spatial light modulator by illuminating an exposed and developed film from behind with a light source such as a xenon lamp or the like and projecting the thus-obtained transmission light onto the spatial light modulator through a magnifying projection optical system composed of a projection lens and a reflection mirror.

The spatial light modulator is composed of a ferroelectric liquid crystal, a photo-electric conversion layer, etc., and is arranged to be capable of storing, over a long period of time after a power supply is turned off, the image information written in by the storing action of the ferroelectric liquid crystal.

In using the image display apparatus for viewing a film image taken by a camera or the like, the user makes back-light illumination with a fluorescent lamp from behind the spatial light modulator in which the film image is written. The film image stored in the spatial light modulator then can be appreciated by viewing a light image having passed through the spatial light modulator.

The operating principle of the spatial light modulator is disclosed in detail in Japanese Laid-Open Patent Application No. HEI 4-299314, etc.

Further, there has been developed another image display apparatus, which is provided with an information display means such as a liquid crystal display element or the like arranged to be capable of selectively displaying one of a frame number of a film image stored in the spatial light modulator and the current time.

However, the conventional image display apparatus has the following shortcomings. Since, even if a frame number of a film image intended to be written into the spatial light modulator is not being displayed by the information display means, an image writing operation on the spatial light modulator can be performed, some film image other than the film image intended by the user might be erroneously written into the spatial light modulator.

Further, in the image display apparatus having an information display means for selectively displaying one of a frame number of a film image and the current time, if the current time is being displayed by the information display means in writing the film image into the spatial light modulator, it is necessary for the user to change the display setting of the information display means to display the frame number of the film image. However, the change of the display setting makes the writing operation of the film image complicated.

Besides, in setting the frame of a film image to be written into the spatial light modulator, if the film is transported correspondingly to the frame number every time an up/down button is pushed for setting an applicable frame number, a length of time required in transporting one frame portion of the film becomes too long before writing the film image of the desired frame into the spatial light modulator.

Further, in the image display apparatus having an information display means for selectively displaying one of a frame number of a film image and the current time, if the frame number of the film image is displayed on the information display means according to the writing operation of the film image by the user and the frame number of the film image is left on display even after the end of the writing operation of the film image, a display contrary to the intention of the user tends to be made.

In the image display apparatus having an information display means for displaying a frame number of a film image, in writing a film image newly into the spatial light modulator, a frame number to be first displayed by the information display means is preferably the frame number of a film image written in the spatial light modulator. However, in a case where a film which differs from a film already written in the spatial light modulator is newly loaded on the image display apparatus, the arrangement for displaying on the information display means the frame number of the film image written in the spatial light modulator tends to bring about the following inconvenience. If the user wishes to view the film images from the first frame of the newly-loaded film, for example, the setting operation for the frame number would require a long period of time, which is inconvenient to the user.

Further, in the image display apparatus having a film frame number setting means for setting a frame number of a film image to be written into the spatial light modulator and an information display means for displaying the frame number, if, when the user operates the film frame number setting means to set a frame number of a film image to be written into the spatial light modulator, a frame number which is not included in the film happens to be set by the user, the nonexistence of that frame number in the film cannot be found by the user before completion of writing the film image into the spatial light modulator.

Further, in the image display apparatus having an information display means for selectively displaying one of a frame number of a film image and the current time, a dedicated operation member is required for setting time. However, the addition of the dedicated operation member has caused an increase in cost of the image display apparatus.

BRIEF SUMMARY OF THE INVENTION

In accordance with one aspect of the invention, when an image recorded on a developed film is optically written into a storage display means, the film is transported until a frame corresponding to a frame number displayed on information display means is reached, so that there can be provided an image display apparatus capable of preventing any undesired film image from being written into the storage display means.

The above and other aspects and feature of the invention will become apparent from the following detailed description of an embodiment thereof taken in connection with the accompanying drawings.

DETAILED DESCRIPTION OF THE INVENTION

Hereinafter, a preferred embodiment of the invention will be described in detail with reference to the drawings.

Figure 5:
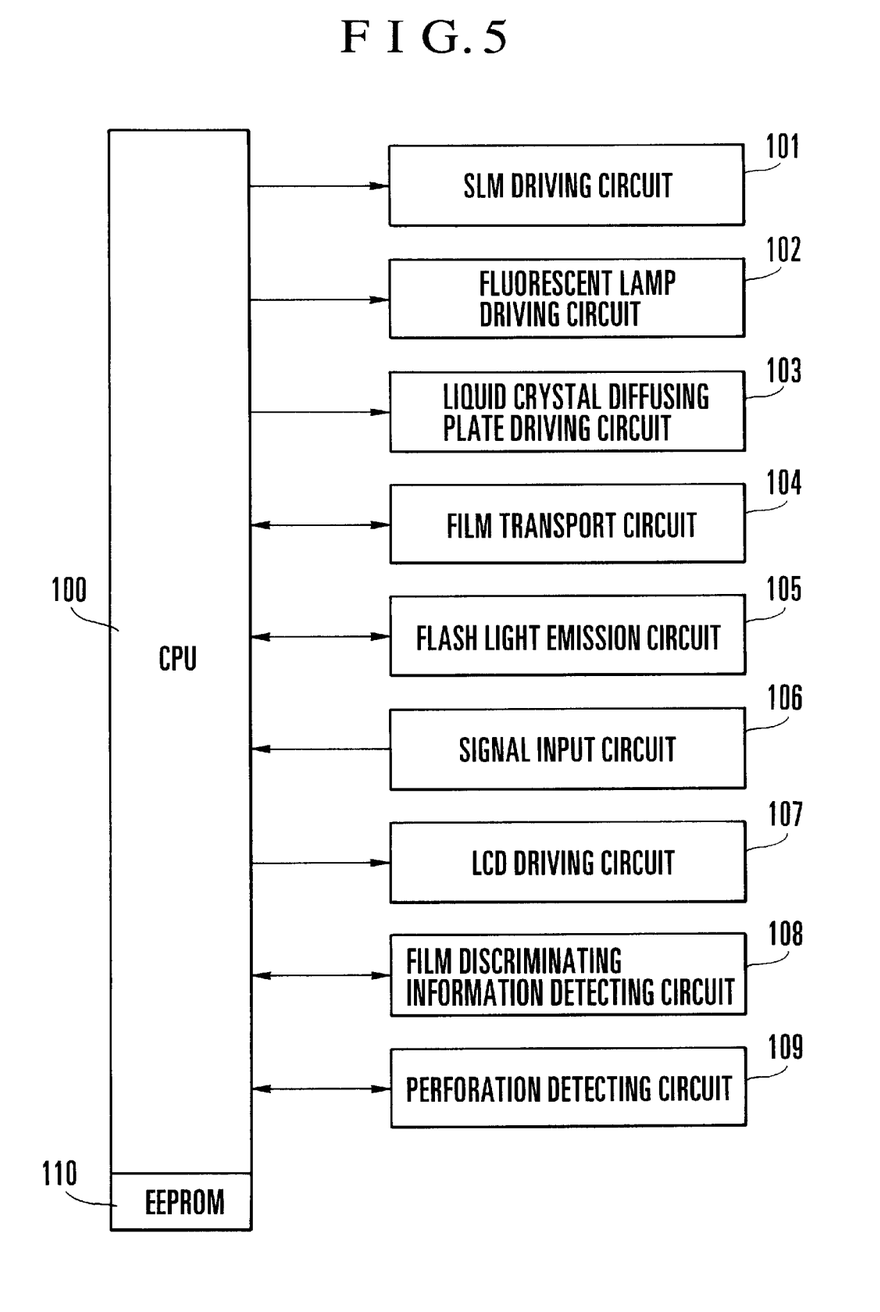
FIG. 5 is a block diagram showing the electric circuitry of the display apparatus.
Figure 6:
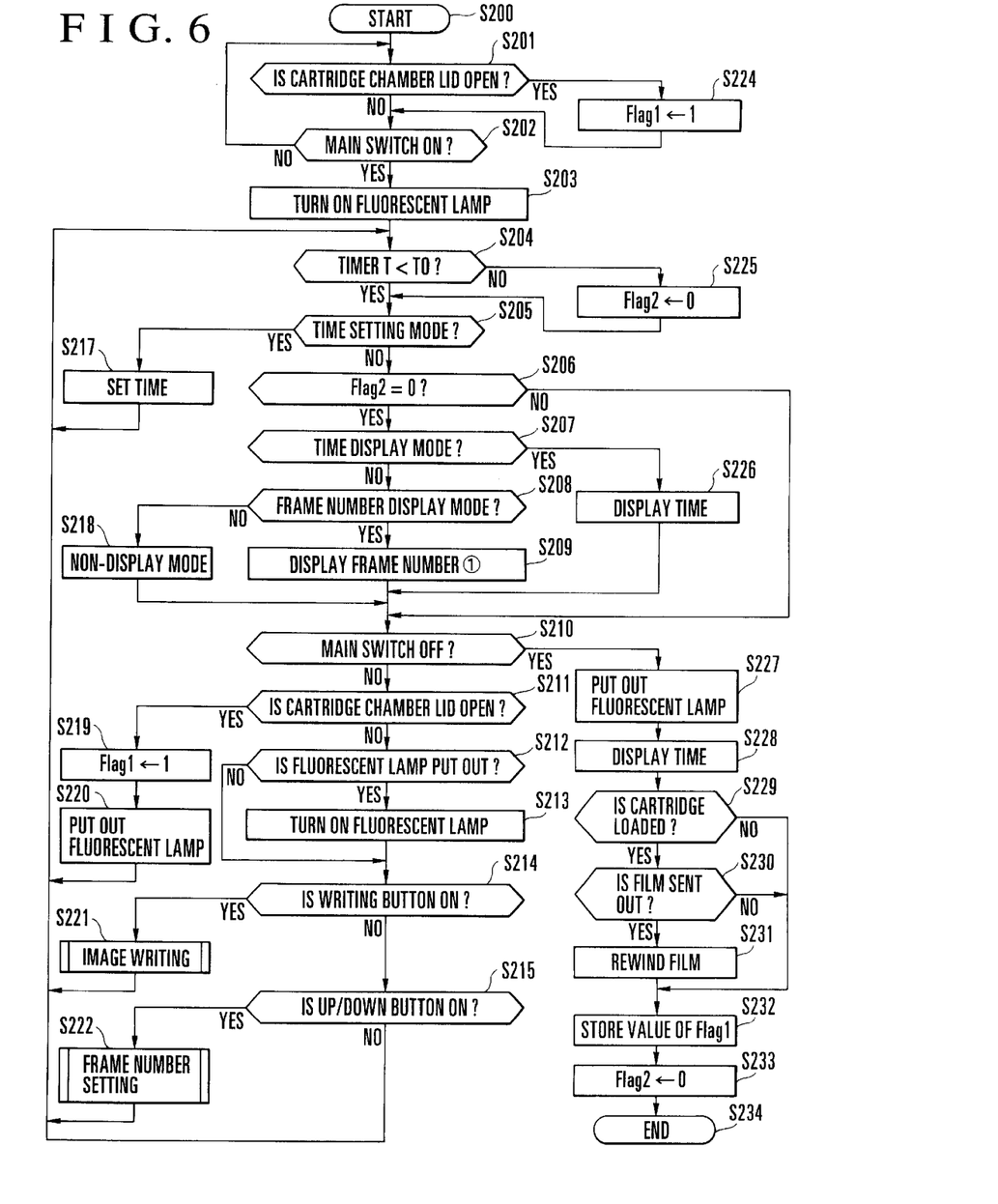
FIG. 6 is a flow chart showing a flow of operation of the display apparatus.

FIGS. 1(a) and 1(b) to FIGS. 4(a), 4(b) and 4(c) show the arrangement of a display apparatus (image display apparatus) 20 according the embodiment of the invention. FIG. 5 shows the electric circuitry of the display apparatus 20. FIG. 6 is a flow chart showing an operation of the display apparatus 20.

Figure 2:
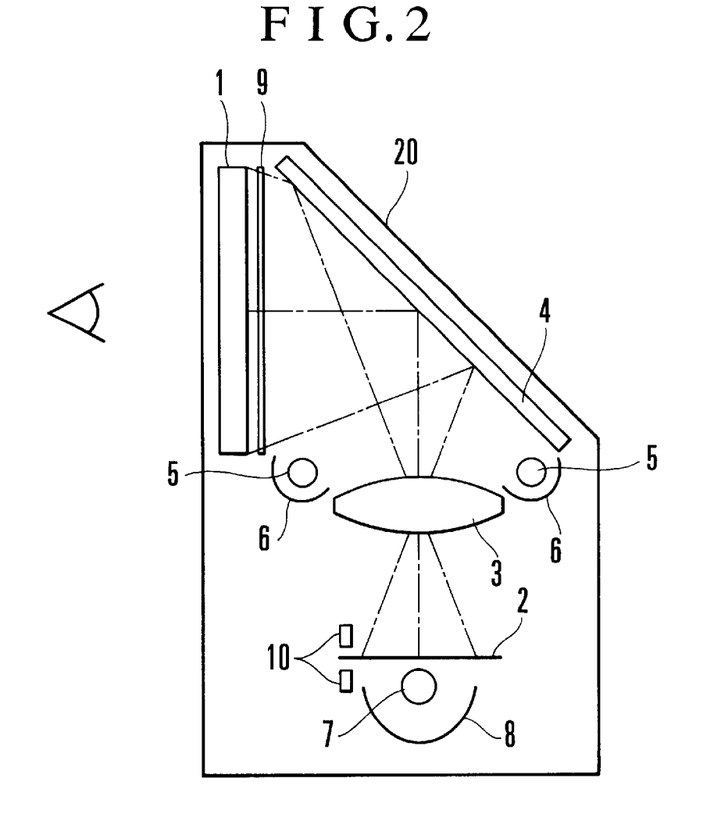
FIG. 2 is a diagram for explaining the layout of the display apparatus.

The display apparatus 20 according to the embodiment of the invention is composed of a spatial light modulator (hereinafter referred to as the SLM) 1 serving as a storage display element, a xenon lamp 7 arranged to illuminate from behind (from below) a developed film 2, which is an original image, i.e., a film image, pulled out from a film cartridge (not shown), a reflector 8 arranged to efficiently collect light emitted from the xenon lamp 7 onto the film 2, a projection lens 3 and a reflecting mirror 4 arranged to project the film image onto the SLM 1, a pair of fluorescent lamps 5 arranged to illuminate the SLM 1, in which the film image is stored, from the same direction as the direction in which the film image is projected, a pair of reflectors 6 arranged to efficiently collect light emitted from the fluorescent lamps 5 onto the SLM 1, and a liquid crystal diffusing plate 9, which is made of a high-molecular dispersive liquid crystal, disposed behind the SLM 1 and arranged to cause light emitted from the fluorescent lamps 5 to be uniformly radiated to the SLM 1.

The SLM 1 is composed of a color filter of pure colors or complementary colors, an ITO which constitutes one transparent electrode, a photo-conductor layer which is made of an organic semiconductor layer or the like, a liquid crystal layer which is made of a ferroelectric liquid crystal (FLC) or the like, an orientation layer, an ITO which constitutes another transparent electrode, and a polarizing film and a glass plate which are arranged to have the above-stated parts sandwiched in between them in a laminated state.

When a voltage is applied from an SLM driving circuit 101 shown in FIG. 5 through the transparent electrode to the ferroelectric liquid crystal layer and the photo-electric conversion layer of the SLM 1, the voltage which is divided by the resistances of the ferroelectric liquid crystal layer and the photo-electric conversion layer is applied to the layers of the SLM 1. Then, the SLM driving circuit 101 applies the voltage to the SLM 1 in such a way as to have the voltage applied to the ferroelectric liquid layer at a value lower than a threshold voltage value at which the ferroelectric liquid crystal molecules are inverted.

With the SLM 1 set in this state, when the SLM 1 is illuminated with the light of the xenon lamp 7 through the film 2, electric charge is generated at areas of the photo-electric conversion layer to lessen the resistance of the photo-electric conversion layer. As a result, the voltage applied to the ferroelectric liquid crystal layer increases at its part corresponding to the area of the photo-electric conversion layer illuminated with the light. The increased voltage then comes to exceed the threshold voltage value at which the ferroelectric liquid crystal molecules are inverted. The ferroelectric liquid crystal molecules are thus inverted. Accordingly, an image recorded on the film 2 is written and stored in the liquid crystal layer. After that, when the SLM 1 is illuminated from the rear side thereof (from the image projecting side) with the light of the fluorescent lamps 5, the image stored in the liquid crystal layer becomes viewable from the front side thereof.

Further, even after the voltage application is cut off, the direction of the liquid crystal molecules can be kept unchanged by the hysteresis characteristic of the ferroelectric liquid crystal. Therefore, the image once written into the SLM 1 can be retained for a long period of time even after the voltage ceases to be applied to the SLM 1.

The arrangement and operation of the liquid crystal diffusing plate 9 which is made of a high-molecular dispersive liquid crystal are disclosed in detail in Japanese Laid-Open Patent Application No. HEI 1-229232. Therefore, the details of them are omitted from the description given here.

The fluorescent lamps 5 are of a linear tube type extending perpendicular to the paper surface of the drawing of FIG. 2 to about the same extent as the width of the SLM 1.

The projection lens 3 is arranged to have the film 2 and the SLM 1 conjugate to each other.

The display apparatus 20 further includes a light projecting and receiving element 10 which is arranged to optically detect the perforations provided in the film 2, a film transport mechanism (not shown) which is arranged to transport, according to a detection signal of the light projecting and receiving element 10, each frame portion of the film 2 to a predetermined writing position where the film 2 is to be illuminated by the xenon lamp 7, and a light projecting and receiving element 26 which is arranged to read a bar code provided on the outside of the film cartridge.

Incidentally, the film 2 is of such a type that a rolled film as already developed is stowed in the film cartridge in a wound state, and the rolled film is to be pulled out from the film cartridge by the film transport mechanism.

Figure 1A:
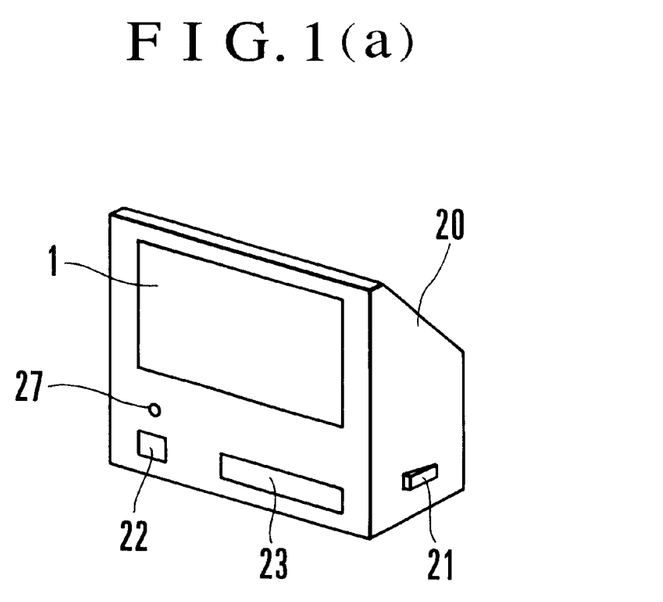
FIGS. 1(a) and 1(b) are a perspective view and a rear view, respectively, of a display apparatus according to an embodiment of the invention.
Figure 1B:
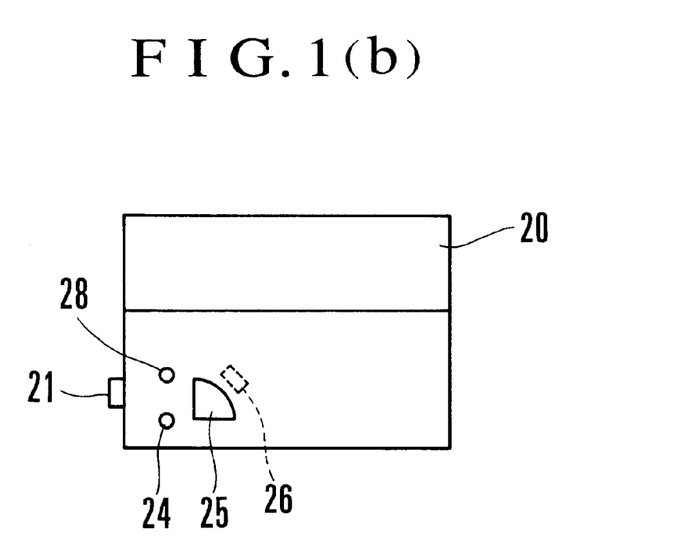

Further, as shown in FIGS. 1(a) and 1(b), a main switch 21 which is a power supply switch of the display apparatus 20 is provided on one side of the display apparatus 20. A film rewinding button 28, a cartridge chamber lid 25 for opening and closing a loading chamber for the film cartridge, and an opening-and-closing button 24 for operating an opening-and-closing mechanism for opening and closing the cartridge chamber lid 25 are disposed on the rear side of the display apparatus 20. The opening-and-closing mechanism is arranged to open and close the cartridge chamber lid 25 every time the opening-and-closing button 24 is pushed.

On the front side of the display apparatus 20, as shown in FIG. 1(a), there are provided an operation switch 23, a liquid crystal display element 22 for selectively displaying one of a frame number of a film image written in the SLM 1 and the current time, and a display change-over button 27 serving as display switching means for changing over the contents of display of the liquid crystal display element 22.

Figure 3:
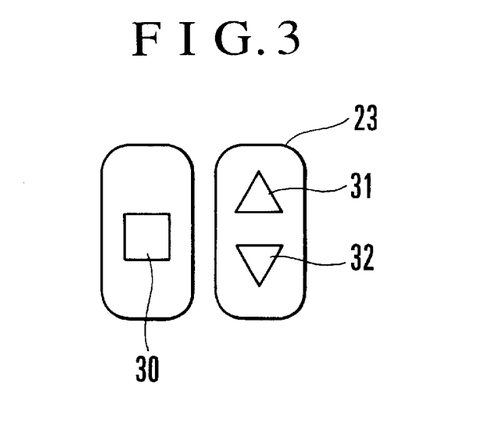
FIG. 3 shows operation switches provided on the display apparatus.

Referring to FIG. 3, the operation switch 23 includes an image writing button 30 serving as instruction means for starting an image writing action on the SLM 1, and an UP button 31 and a DOWN button 32 serving as frame number setting means for setting the frame number of a film image to be written into the SLM 1.

Every time the display change-over button 27 is pushed, a display provided on the liquid crystal display element 22 is changed over in the order of "non-display mode"→"frame number display mode"→"time display mode"→"time setting mode"→"non-display mode".

Figure 4A:
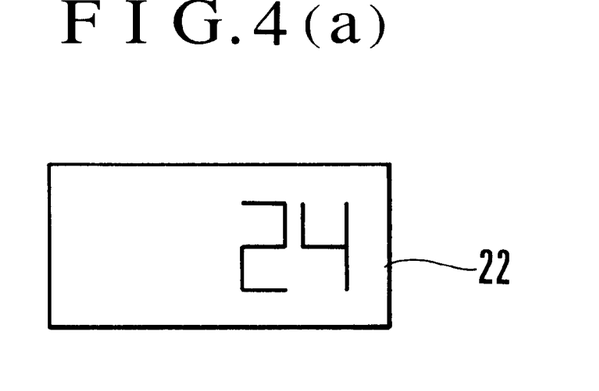
FIGS. 4(a), 4(b) and 4(c) are diagrams for explaining a liquid crystal display element provided the display apparatus.
Figure 4B:
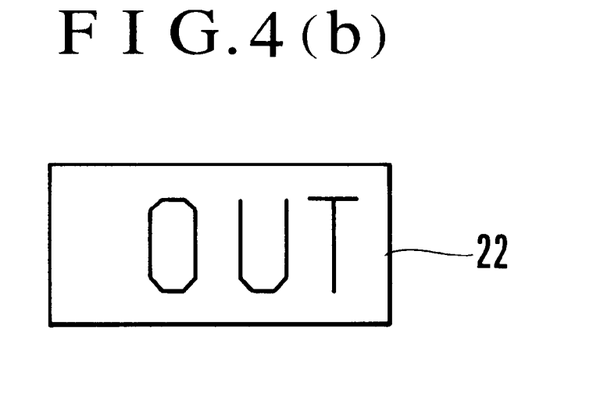
Figure 4C:
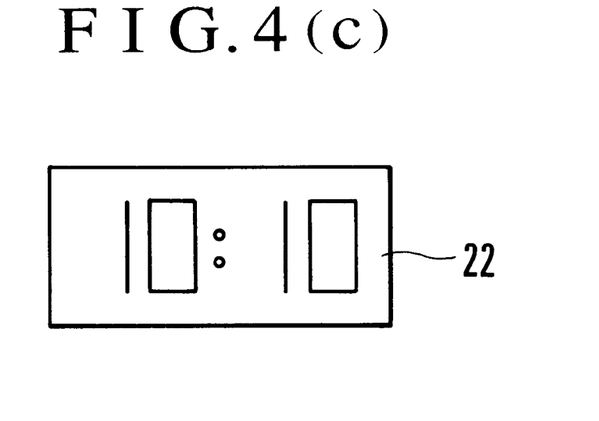

The liquid crystal display element 22 is formed with a known reflection TN type liquid crystal display element and is arranged to make displays, as shown in FIGS. 4(a) to 4(c), a frame number, for example, as "24", the absence of the film cartridge as "OUT" and the current time as "10:10" by the known dot-matrix display method.

The control part of the display apparatus 20 is composed of various circuits as shown in FIG. 5. Referring to FIG. 5, the SLM driving circuit 101 is arranged as mentioned above. A fluorescent lamp driving circuit 102 is arranged to control the light emission of the fluorescent lamps 5. A liquid crystal diffusing plate driving circuit 103 is arranged to control the diffusing and transmitting actions of the liquid crystal diffusing plate 9. A film transport circuit 104 is arranged to control the film transport mechanism and to constitute film transport means in combination with the film transport mechanism. A flash light emission circuit 105 is arranged to control light emission by the xenon lamp 7. A signal input circuit 106 is arranged to supply a signal from each of switches provided on the display apparatus 20 to a CPU 100. A perforation detecting circuit 109 is arranged to control the light projecting and receiving element 10. An LCD driving circuit 107 is arranged to drive and control the liquid crystal display element 22. A film discriminating information detecting circuit 108 is arranged to control the light projecting and receiving element 26. An EEPROM 110 is arranged to store the frame number of a film image written in the SLM 1 and data recorded in the magnetic storage part of the film 2. The CPU 100 is arranged to control actions of the circuits mentioned above.

The CPU 100 is further arranged to serve also as film loading-and-unloading detecting means for finding whether the film cartridge is loaded or unloaded on or from the display apparatus 20. More specifically, the CPU 100 is arranged to detect whether the film cartridge is placed within the cartridge loading chamber by causing the film discriminating information detecting circuit 108 to drive the light projecting and receiving element 26 to read a bar code provided on the outside of the film cartridge and thus to detect film discriminating information from the bar code.

The CPU 100 further has a clock function to serve as time count means (timer) and is also arranged to serve as frame number determining means.

The operation of the display apparatus 20 is next described with reference to FIGS. 6, 7 and 8 which are flow charts. At a step S201 of FIG. 6, the CPU 100 makes a check to find if the cartridge chamber lid 25 is open by detecting the state of the opening-and-closing button 24 through the signal input circuit 106. When the user pushes the opening-and-closing button 24 for newly loading a film for appreciating a film image on the display apparatus 20, the flow of operation proceeds from the step S201 to a step S224. At the step S224, the CPU 100 sets to "1" a flag "Flag1" which indicates that a film cartridge has been loaded. If the opening-and-closing button 24 is not pushed and no film cartridge is loaded, the flag "Flag1" is set to "0". The flow then proceeds to a step S202.

At the step S202, the CPU 100 waits until the main switch 21 is turned on by the user.

When the main switch 21 is turned on by the user, the CPU 100 detects the on-state of the main switch 21, and the flow proceeds to a step S203. At the step S203, the CPU 100 sends a signal to the fluorescent lamp driving circuit 102 to turn on the fluorescent lamps 5. With the fluorescent lamps 5 turned on, the SLM 1 is uniformly illuminated through the liquid crystal diffusing plate 9, which is set in a diffusing state, by the reflecting mirror 4 and the liquid crystal diffusing plate driving circuit 103. Accordingly, the user can appreciate a film image already stored in the SLM 1, by viewing light passing through the SLM 1.

Further, when the main switch 21 turned on, the flow proceeds to a step S204. At the step S204, the CPU 100 compares a counted time value T with a time value T0 which has been set beforehand. If the counted time T is found to be shorter than the preset time T0, the flow proceeds to a step S205. At the step S205, the CPU 100 makes a check through the signal input circuit 106 to find if the display mode of the liquid crystal display element 22 is in the "time setting mode".

If the display mode of the liquid crystal display element 22 is in the "time setting mode", a display part "hour" first comes to flicker. Then, a figure representing the hour becomes variable by the user pushing either the UP button 31 or the DOWN button 32 serving as the frame number setting means. When the user pushes the image writing button 30, the "hour" setting process comes to an end, and another display part "minute" comes to flicker. Then, a figure representing the minute becomes variable by the user pushing the UP button 31 or the DOWN button 32. When the user further pushes the image writing button 30, a process of setting the "minutes" can be terminated (S217).

If the liquid crystal display element 22 is found at the step S205 to be not set in the "time setting mode", the flow proceeds to a step S206. At the step S206, the CPU 100 makes a check for the value of a flag "Flag2" which indicates whether or not the frame number of a film image is in process of setting. If the flag "Flag2" is at "0", this indicates that the user is not setting the frame number of any film image to be written in. If the flag "Flag2" is at "1", this indicates that the user is setting the frame number of a film image.

If the frame number setting operation is found to be not in process, the flow proceeds from the step S206 to a step S207. At the step S207, the CPU 100 makes a check to find if the display mode of the liquid crystal display element 22 is in the "time display mode". If so, the flow proceeds to a step S226. At the step S226, the CPU 100 causes the liquid crystal display element 22 to display the current time by sending a signal to the LCD driving circuit 107.

If the display mode is found at the step S207 to be not the "time display mode", the flow proceeds to a step S208. At the step S208, the CPU 100 makes a check to find if the display mode is in the "frame number display mode". If so, the flow proceeds to a step S209. AT the step S209, the CPU 100 causes the liquid crystal display element 22 to display the frame number ① as shown in FIG. 4(a) by sending a signal to the LCD driving circuit 107. The frame number ① represents the frame number of a film image already written in the SLM 1. This frame number ① is stored in the EEPROM 110.

If the display mode is found at the step S208 to be not the "frame number display mode", the flow proceeds to a step S218. At the step S218, the CPU 100 makes the display mode into a "non-display mode" and sends a signal to the LCD driving circuit 107 to cause the liquid crystal display element 22 to make no display.

At a step S210, after the display setting action on the liquid crystal display element 22, the CPU 100 again makes a check for the state of the main switch 21 through the signal input circuit 106.

If the main switch 21 is found to be in the onstate, the flow proceeds to a step S211 to make a check to find if the cartridge chamber lid 25 is open. If so, the flow proceeds to a step S219. At the step S219, the user is assumed to be replacing the film cartridge and the flag "Flag1" is set at "1". At the same time, at a step S220, the CPU 100 sends a signal to the fluorescent lamp driving circuit 102 to put out the fluorescent lamps 5 which have been illuminating the SLM 1 from behind.

If the cartridge chamber lid 25 is found at the step S211 to be closed, on the other hand, the CPU 100 makes a check to find if the fluorescent lamps 5 is put out (S212). If so, the flow proceeds to a step S213 to turn on the fluorescent lamps 5 by sending a signal to the fluorescent lamp lighting circuit 102. Since the lighting state of the fluorescent lamps 5 is controlled according to the open or closed state of the cartridge chamber lid 25 in this manner, the user is allowed to know that the cartridge chamber lid 25 is left open, if the fluorescent lamps 5 are put out with the main switch 21 in the on-state.

At a step S214, the CPU 100 makes a check to find if the image writing button 30 is pushed through the signal input circuit 106. If so, the flow proceeds to a step S221. At the step S221, the CPU 100 executes a film image writing subroutine shown in FIG. 7.

Figure 7:
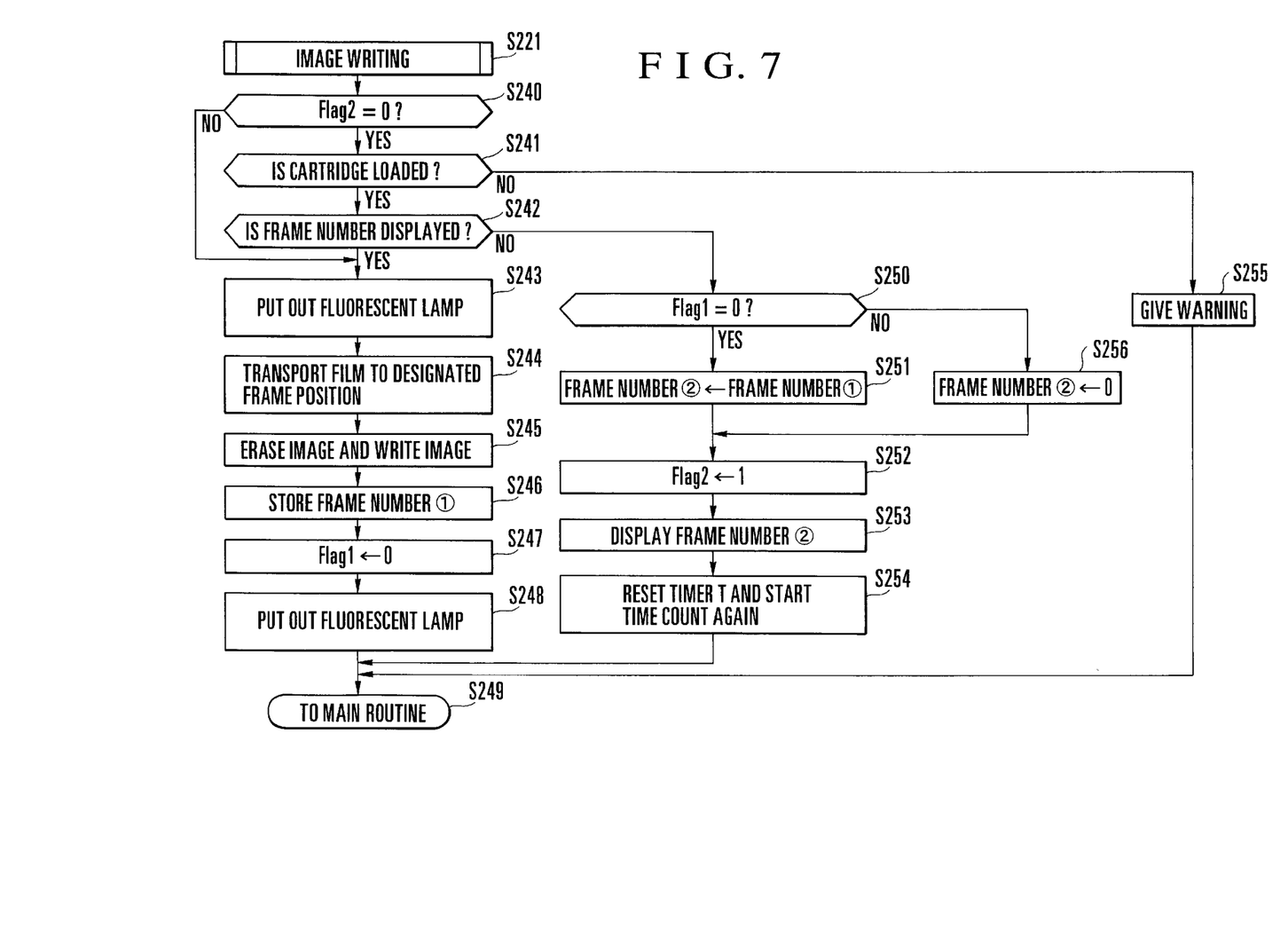
FIG. 7 is another flow chart showing the flow of operation of the display apparatus.

At s step S240 of FIG. 7, the CPU 100 makes a check for the value of the flag "Flag2" to find if the frame number of a film image is in process of setting. If the flag "Flag2" is found to be at "0" thus indicating that no film frame number is being set by the user, the flow proceeds to a step S241. At the step S241, the CPU 100 makes a check to find if a film cartridge is loaded in the cartridge chamber.

If no film cartridge is found to be loaded, the flow proceeds from the step S241 to a step S255. At the step S255, the CPU 100 sends a signal to the LCD driving circuit 107 to cause the liquid crystal display element 22 to make a display "OUT" as shown in FIG. 4(b). This display "OUT" warns the user that no film cartridge is loaded. The flow then returns from the step S255 to the main routine through a step S249.

If a film cartridge is found at the step S241 to be loaded, the flow proceeds to a step S242. At the step S242, a check is made to find if the frame number of a film image is being displayed on the liquid crystal display element 22. If not, the flow proceeds to a step S250. At the step S250, a check is made for the value of the flag "Flag1" which indicates the open or closed state of the cartridge chamber lid 25.

If the value of the flag "Flag1" is found to be at "0" which indicates that the cartridge chamber lid 25 is closed, it is assumed that the film cartridge is not replaced after a film image is written into the SLM 1. The flow then proceeds from the step S250 to a step S251. At the step S251, the CPU 100 sets a frame number ② which is being displayed at present, as the frame number ①, stored in the EEPROM 110, of the film image which is written in the SLM 1. This frame number is displayed later, at a step S253, on the liquid crystal display element 22 to enable the user to set a film frame number on the basis of the frame number of the film image written in the SLM 1.

On the other hand, if the value of the flag "Flag1" is found at the step S250 to be at "1" which indicates that the cartridge chamber lid 25 is open, the flow proceeds from the step S250 to a step S256. At the step S256, it is assumed that the film cartridge is taken out after the film image is written into the SLM 1, and the CPU 100 then sets "0" as the frame number ② which is being displayed at present. With the frame number displayed later on the liquid crystal display element 22 at the step S253, the user is enabled to set a film frame number in such a way as to write a film image into the SLM 1 in regular order from the first frame of a film newly loaded thereafter.

After the frame number ② to be displayed on the liquid crystal display element 22 is thus set, the flow proceeds to a step S252. At the step S252, the CPU 100 sets the flag "Flag2" which indicates whether or not a film frame number is in process of setting at "1" to indicate that the frame number is in process of setting. At the next step S253, a signal is sent to the LCD driving circuit 107 to cause the liquid crystal display element 22 to display the frame number ② which is in process of setting.

After the film frame number is set by the user, the flow proceeds to a step S254. At the step S254, the CPU 100 resets the time count value of the timer T at "0" and, after that, starts a time count again. The flow then returns to the main routine through the step S249.

As described above, if no film frame number is displayed on the liquid crystal display element 22 when the image writing button 30 is pushed, the CPU 100 inhibits writing any film image into the SLM 1, on the assumption that the image writing button 30 is pushed by the user by mistake.

Further, in consideration of the possibility that the image writing button 30 may be intentionally pushed by the user for rewriting a film image, the CPU 100 is arranged to have a film frame number displayed on the liquid crystal display element 22 as preparation for writing a film image, although no film image is allowed to be written in while no film frame number is displayed on the liquid crystal display element 22. This arrangement enables the user to recognize the frame number displayed by the liquid crystal display element 22. In this instance, the CPU 100 waits until the image writing button 30 is pushed again.

In case where a film cartridge is found at the step S241 to be loaded in the cartridge chamber and a film frame number is found at the step S242 to be displayed by the liquid crystal display element 22, the flow proceeds from the step S242 to a step S243. At the step S243, the CPU 100 assumes that the user has pushed the image writing button 30 to write a film image into the SLM 1 after recognizing a film frame number displayed on the liquid crystal display element 22, and then causes the fluorescent lamps 5 to put out the black-light illumination applied to the SLM 1, by sending a signal to the fluorescent lamp driving circuit 102.

At a step S244, the CPU 100 sends signals to the perforation detecting circuit 109 and the film transport circuit 104 to cause the film transport mechanism to bring to a predetermined writing position, a film frame which corresponds to the frame number ② displayed by the liquid crystal display element 22 as in process of setting.

Arrival or nonarrival of the frame which corresponds to the frame number ② at the writing position is detected with the perforations of the film 2 optically detected by the light projecting and receiving element 10. More specifically, when receiving a signal from the CPU 100, the perforation detecting circuit 109 causes the light projecting part of the light projecting and receiving element 10 to emit light for illuminating an edge part of the film 2 and the light receiving part of the light projecting and receiving element 10 to receive light passing through the perforations so as to detect the output of the light projecting and receiving element 10. The CPU 100 determines the serial number of the frame arrived at the predetermined writing position, from the output of the light projecting and receiving element 10 detected by the perforation detecting circuit 109.

At a step S245, when the frame corresponding to the frame number ② comes to the writing position, the CPU 100 executes writing a film image into the SLM 1.

The CPU 100 first sends a signal to the SLM driving circuit 101 to apply a reset pulse signal to the SLM 1 for erasing an existing image written in the SLM 1. Next, the CPU 100 sends a signal to the flash light emission circuit 105 to cause the xenon lamp 7 to emit light and to uniformly illuminate the film 2. Light passing through the film 2 is projected onto the SLM 1 through the projection lens 3, the reflecting mirror 4 and the liquid crystal diffusing plate 9. Then, a voltage is applied by the liquid crystal diffusing plate driving circuit 103 to set the liquid crystal diffusing plate 9 into a transmissive state, so that the SLM 1 can be illuminated with writing light without hindrance.

While the xenon lamp 7 is emitting light, the CPU 100 sends a signal to the SLM driving circuit 101 to apply a predetermined pulse voltage to the SLM 1. At this time, in the SLM 1, the ferroelectric liquid crystal molecules of areas illuminated by light applied to the photo-electric conversion layer are inverted to transfer a film image to the SLM 1. The film image thus written into the SLM 1 is stored over a long period of time by a storing action of the ferroelectric liquid crystal which constitutes a part of the SLM 1.

At a step S246, upon completion of the writing action of the film image into the SLM 1, the CPU 100 causes the frame number of the film image written into the SLM 1 to be stored, as the frame number ①, in the EEPROM 110.

At a step S247, the CPU 100 sets the value of the flag "Flag1" at "0" to indicate that the display apparatus 20 is loaded with a film cartridge which has film images including the film image written in the SLM 1.

At the next step S248, the CPU 100 sends a signal to the fluorescent driving circuit 102 to turn on the fluorescent lamps 5. At the same time, the CPU 100 sends a signal to the liquid crystal diffusing plate driving circuit 103 to bring the voltage application to the liquid crystal diffusing plate 9 to a stop in such a way as to set the liquid crystal diffusing plate 9 in a diffusing state. Accordingly, the light passing through the SLM 1 which is uniformly illuminated by the fluorescent lamps 5 through the reflecting mirror 4 and the liquid crystal diffusing plate 9 enables the user to view an object image taken on the film 2 by a camera or the like.

Upon completion of the sequence of processes of the writing action of the film image into the SLM 1, the flow of operation returns to the main routine through the step S249.

Upon return from the image writing subroutine to the main routine, the flow of operation of the CPU 100 returns to the step S204 of FIG. 6.

In the main routine, when the image writing button 30 is found at the step S214 to be not pushed, the flow proceeds from the step S214 to a step S215. At the step S215, a check is made to find if the UP button 31 or the DOWN button 32 is pushed. When the UP button 31 or the DOWN button 32 is pushed by the user with the intention of setting a frame number of a film image to be written into the SLM 1, the flow proceeds to a step S222. At the step S222, the CPU 100 executes a subroutine for setting a frame number of a film image to be written into the SLM 1, as shown in FIG. 8.

Figure 8:
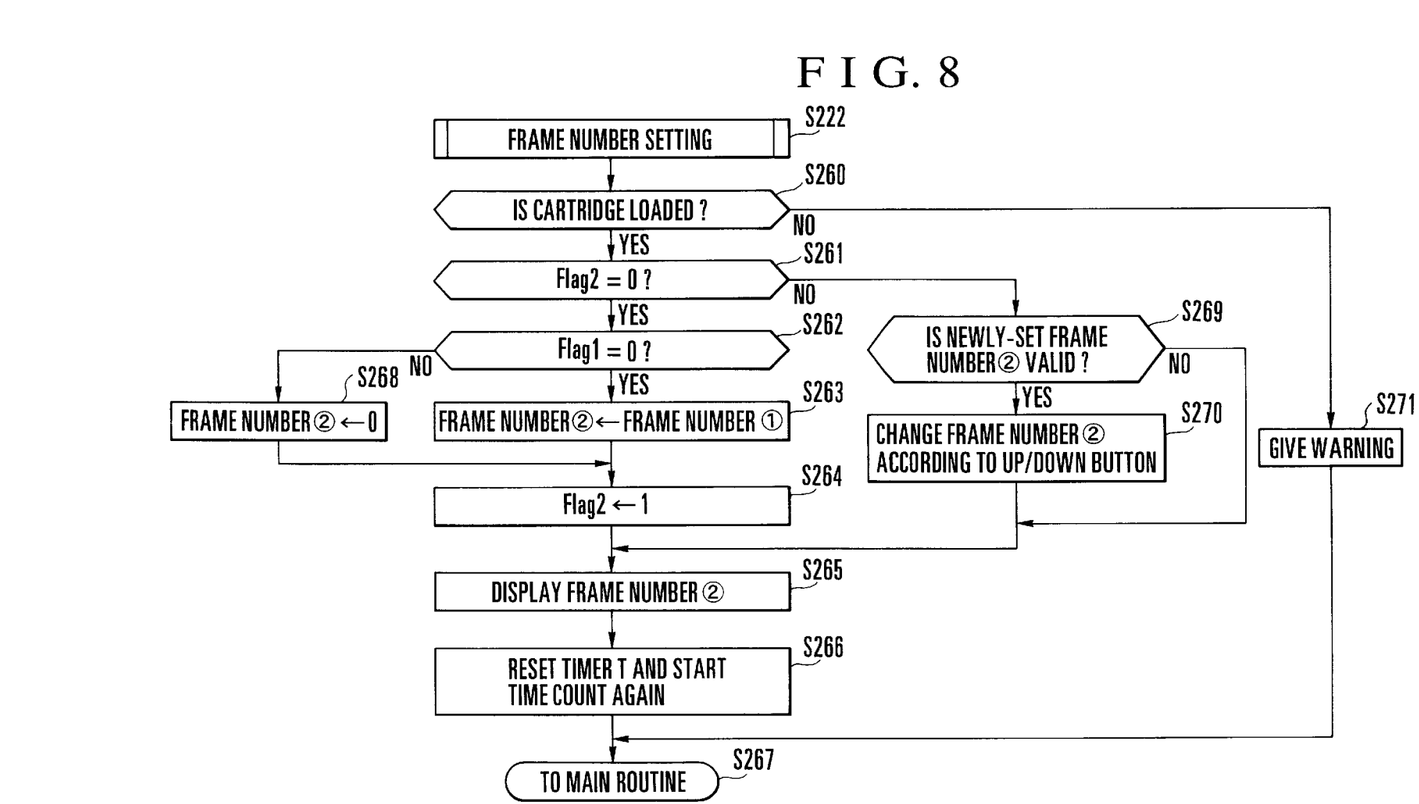
FIG. 8 is a further flow chart showing the flow of operation of the display apparatus.

At a step S260 of FIG. 8, the CPU 100 makes a check to find if a film cartridge is loaded in the cartridge chamber, as in the case of the step S241. If not, the flow proceeds to a step S271. At the step S271, the CPU 100 sends a signal to the LCD driving circuit 107 to make a display "OUT" on the liquid crystal display element 22, as shown in FIG. 4(*b*). The display "OUT" warns the user that the display apparatus 20 is loaded with no film. After this warning is left on display for a while, the flow returns to the main routine through a step S267.

If the display apparatus 20 is found at the step S260 to be loaded with a film cartridge, on the other hand, the flow proceeds to a step S261. At the step S261, the CPU 100 makes a check for the value of the flag "Flag2" which indicates whether or not the frame number of a film image is in process of setting. If the flag "Flag2" is found to be at "0" which indicates that no film frame number is in process of setting, the flow proceeds from the step S261 to a step S262. At the step S262, the CPU 100 makes a check for the value of the flag "Flag1" which indicates either a mounted state or a demounted state of a film cartridge.

If the flag "Flag1" is found at the step S262 to be set at "0" which indicates that a film cartridge used for writing a film image into the SLM 1 is not replaced with a new film cartridge, the flow of operation proceeds from the step S262 to a step S263. At the step S263, the CPU 100 sets the frame number ② which is currently in process of setting, as the frame number ①, stored in the EEPROM 110, of the film image written in the SLM 1. This frame number is displayed later, at a step S265, on the liquid crystal display element 22 to enable the user to set a film frame number on the basis of the frame number ① of the film image written in the SLM 1.

On the other hand, if the value of the flag "Flag1" is found at the step S262 to be at "1" which indicates that the film cartridge has been replaced after the film image is written in the SLM 1, the flow proceeds from the step S262 to a step S268. At the step S268, the CPU 100 sets "0" as the frame number ② which is currently in process of setting. When that frame number is displayed later on the liquid crystal display element 22 at the step S265, the user is enabled to set a frame number of a film image to be written into the SLM 1, in regular order from the first frame of a film newly loaded thereafter.

At a step S264, the CPU 100 causes the value of the flag "Flag2" which indicates whether or not a film frame number is in process of setting to be set at "1" to indicate that the frame number is in process of setting. At the next step S265, a signal is sent to the LCD driving circuit 107 to cause the liquid crystal display element 22 to display the frame number ② which is in process of setting.

Thus, if the user pushes the UP button 31 or the DOWN button 32 with the intention of setting a frame number of a film image to be written in the SLM 1 even when no film frame number is displayed by the liquid crystal display element 22, the CPU 100 immediately causes the film frame number to be displayed by the liquid crystal display element 22. The user is thus enabled to see, on the liquid crystal display element 22, the film frame number currently in process of setting, without operating the display change-over button 27.

On the other hand, with the display apparatus 20 loaded with a film cartridge, if the value of the flag "Flag2" which indicates whether or not a film frame number is in process of setting is found at the step S261 to be at "1", the flow proceeds from the step S261 to a step S269. At the step S269, the CPU 100 makes a check to find if a film frame number being newly set by operating the UP button 31 or the DOWN button 32 is valid with respect to the film frame number ② displayed on the liquid crystal display element 22. In other words, a check is made to find if the film frame number being newly set by the user does not come to exceed a number of exposed film frames detected through the film discriminating information detecting circuit 108. The check is made also to find if the film frame number being newly set by the user becomes smaller than "1".

If the film frame number being newly set by the user is found at the step S269 to be valid, the flow proceeds to a step S270. At the step S270, the CPU 100 performs an adding or subtracting operation on the film frame number ② which is currently in process of setting, according to the operation of the UP button 31 or the DOWN button 32.

On the other hand, if the film frame number to be newly set by the user is found at the step S269 either to exceed the number of exposed frames or to be smaller than "1", the flow proceeds to the step S265. At the step S265, the CPU 100 inhibits the value of the film frame number ② which is in process of setting from being changed (updated) and keeps the frame number ② currently on display unchanged.

At the next step S266, after the frame number ② is displayed on the liquid crystal display element 22, the CPU 100 resets the time value of the timer T at "0" and allows the timer T to restart its time count after the film frame number is set by the user. The flow then returns to the main routine through the step S267.

When returning from the frame number setting subroutine to the main routine, the flow proceeds to the step S204. After that, when the main switch 21 is found at the step S210 to be turned off by the user after viewing the film image, the flow proceeds from the step S210 to a step S227. At the step S227, the CPU 100 sends a signal to the fluorescent lamp driving circuit 102 to cause the fluorescent lamps 5 to be put out. At the next step S228, the CPU 100 sends a signal to the LCD driving circuit 107 to cause the liquid crystal display element 22 to display the current time, as shown in FIG. 4(c).

Then, if the display apparatus 20 is found at the next step S229 to be in a state of being loaded with a film cartridge and if the film 2 is found at a step S230 to be in a state of being sent out from the film cartridge, the flow proceeds to a step S231. At the step S231, the CPU 100 sends a signal to the film transport circuit 104 to cause the film transport mechanism to rewind the film 2.

At a step S232, the CPU 100 stores, in the EEPROM 110, the value of the flag "Flag1" which indicates the loaded or unloaded state of the film cartridge. At a step S233, the value of the flag "Flag2" which indicates whether or not a film frame number is in process of setting is set at "0".

Upon completion of the sequence of processes, the flow proceeds to a step S234. The flow then returns to the step S200 and waits until the main switch 21 is found at the step S202 to be turned on.

In the foregoing description of the embodiment, the liquid crystal display element is arranged to make displays of "film number", "time" and "warning". However, in accordance with the invention, the liquid crystal display element may be arranged to make also some other displays, such as "date", "title of a film frame" and "photo-taking information".

In the case of the embodiment described above, the invention is applied to an image display apparatus using a liquid crystal type spatial light modulator as the storage display means. However, the invention is applicable also to an image display apparatus having a spatial light modulator of a type other than the liquid crystal type, such as a spatial light modulator using a BSO, or some other storage display means.

The embodiment is arranged, as described above, to transport the film to bring a frame corresponding to a frame number displayed on information display means to a predetermined position, when an instruction is given to write a film image into the storage display means. This arrangement ensures that a desired frame can be accurately stored and that any frame that is not intended can be prevented from being stored by mistake.

The embodiment is arranged to inhibit any image storing action on the storage-and-display means when no film frame number is displayed by the information display means. That arrangement ensures that no film image is allowed to be stored (written) in the storage display means against the intention of the user.

The embodiment is arranged to have a film frame number displayed by the information display means when frame number setting means or instruction means is operated. The arrangement enables the user to easily confirm the frame number of a film image to be written into the storage display means and to easily perform a film image writing action on the storage display means.

The embodiment is arranged to transport the film to bring, to a predetermined writing position, a film frame corresponding to a film frame number displayed on the information display means, when the instruction means is operated. Therefore, a period of time required for writing the film image of a desired frame into the storage display means by the user can be shortened by the arrangement.

The embodiment is arranged to include time count means for starting a time count when the frame number setting means or the instruction means is operated, and to consider a film image writing operation by the user to have finished when a predetermined period of time is counted by the time count means. The arrangement allows the user to change a content of display of the information display means to a content of display initially set by the user, so that the display can be made as desired by the user.

The embodiment is arranged such that, after an image is written into the storage display means, the display of a film frame number by the information display means is controlled by control means according to the result of detection made by film loading-and-unloading detecting means. Therefore, in a case where the user wishes to view a new film from the first frame thereof, a period of time required in setting a frame number can be shortened by the arrangement.

The embodiment is arranged to make a check for validity of a frame number of film set by the frame number setting means, and to inhibit the film frame number displayed by the information display means from being updated if the frame number is found to be invalid. The arrangement effectively prevents the user from setting any frame number that is not included in the film.

Further, the embodiment is arranged to permit time setting according to the operation of the film frame number setting means when the mode of display on the information display means is changed by display switching means over to a time display mode. The arrangement permits reduction in cost of the apparatus as it dispenses with any operation member that would otherwise be necessary solely for the purpose of setting time.

What is claimed is:

1. An image display apparatus for displaying a plurality of images formed on a film frame stored in a film cartridge, comprising:

a transport device for mechanically transporting the film of the film cartridge;

a storage display element which stores an image by receiving image light from the film frame that is photographed by a camera and developed;

an optical unit for optically conjugating the storage display element and the film frame, said optical unit projecting an image formed on the film frame onto the storage display_element, and said storage element displaying the image projected by said optical unit;

a display device capable of displaying a number of a film frame; and a transport device control circuit which, when receiving an instruction for an images storing action on said storage display element, causes a film to be transported up to a position of a frame corresponding to the film frame number displayed by said display device.

2. An image display apparatus for displaying plurality of images formed on a film frame stored in a film cartridge, comprising:

a transport device for mechanically transporting the film of the film cartridge;

a storage display element which stores an image by receiving image light from the film frame that is photographed by a camera and developed;

an optical unit for opticaly conjugating the storage display element and the film frame, said optical unit projecting an image formed on the film frame onto the storage display_element, and said storage element displaying the image projected by said optical unit;

a determining circuit which, when receiving an instruction for an image storing action on said storage display element, determines whether said image display apparatus is in a state in which the image storing action is acceptable; and a circuit which changes said image display apparatus into the state in which the image storing action is acceptable, when said determining circuit determines that said image display apparatus is not in the state in which the image storing action is acceptable.

3. An image display apparatus for displaying a plurality of images formed on a film fiame stored in a film cartridge, comprising:

a transport device for mechanically transporting the film of the film cartridge;

a storage display element which stores an image by receiving image light from the film frame that is photographed by a camera and developed;

an optical unit for optically conjugating the storage display element and the film frame, said optical unit projecting an image formed on the film frame onto the storage display_element, and said storage element displaying the image projected by said optical unit;

a display device capable of selectively displaying one of a film frame number and information other than the film frame number; and a control circuit which inhibits an image storing action on said storage display element when no film frame number is displayed by said display device.

4. An image display apparatus according to claim 3, further comprising a time count circuit which starts a time count when said setting circuit or said instruction circuit is operated upon receipt of the operation thereon, wherein said control circuit changes a content of display of said display device when a predetermined period of time has been counted by said time count circuit.

5. An image display apparatus according to claim 4, wherein the content of display of said display device other than a frame number is time.

6. An image display apparatus according to claim 1, wherein said storage display element is a spatial light modulator.

7. An image display apparatus according to claim 2, wherein said storage display element is a spatial light modulator.

8. An image display apparatus according to claim 3, wherein said storage display element is a spatial light modulator.

* * * * *

UNITED STATES PATENT AND TRADEMARK OFFICE
CERTIFICATE OF CORRECTION

PATENT NO.    : 6,518,940 B2
DATED         : February 11, 2003
INVENTOR(S)   : Akihiko Nagano It is certified that error appears in the above-identified patent and that said Letters Patent is hereby corrected as shown below:

Column 13,
Line 22, delete "display_element," and insert -- display element, --.
Line 27, delete "images" and insert -- image --.
Line 43, delete "display_element," and insert -- display element, --.

Column 14,
Line 9, delete "fiame" and insert -- frame --.
Line 18, delete "display_element," and insert -- display element, --.

Signed and Sealed this

Twenty-third Day of September, 2003

JAMES E. ROGAN
*Director of the United States Patent and Trademark Office*